April 11, 1944.　　　J. B. CONTNER　　　2,346,472
DISPLAY APPARATUS
Filed June 4, 1941　　　5 Sheets-Sheet 1

INVENTOR.
J. Burgi Contner
BY
Watson, Bristol, Johnson & Leavenworth
ATTORNEYS

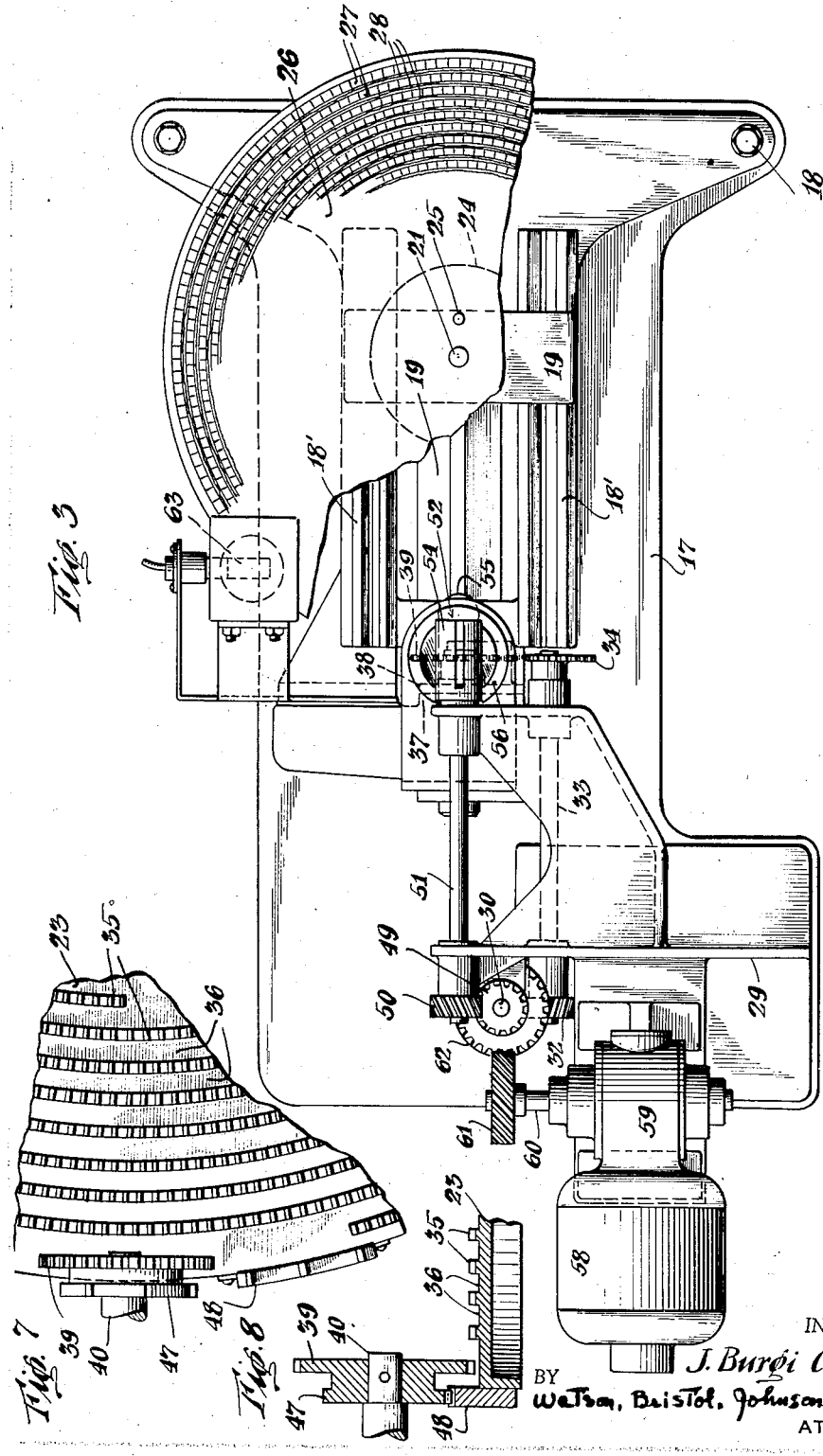

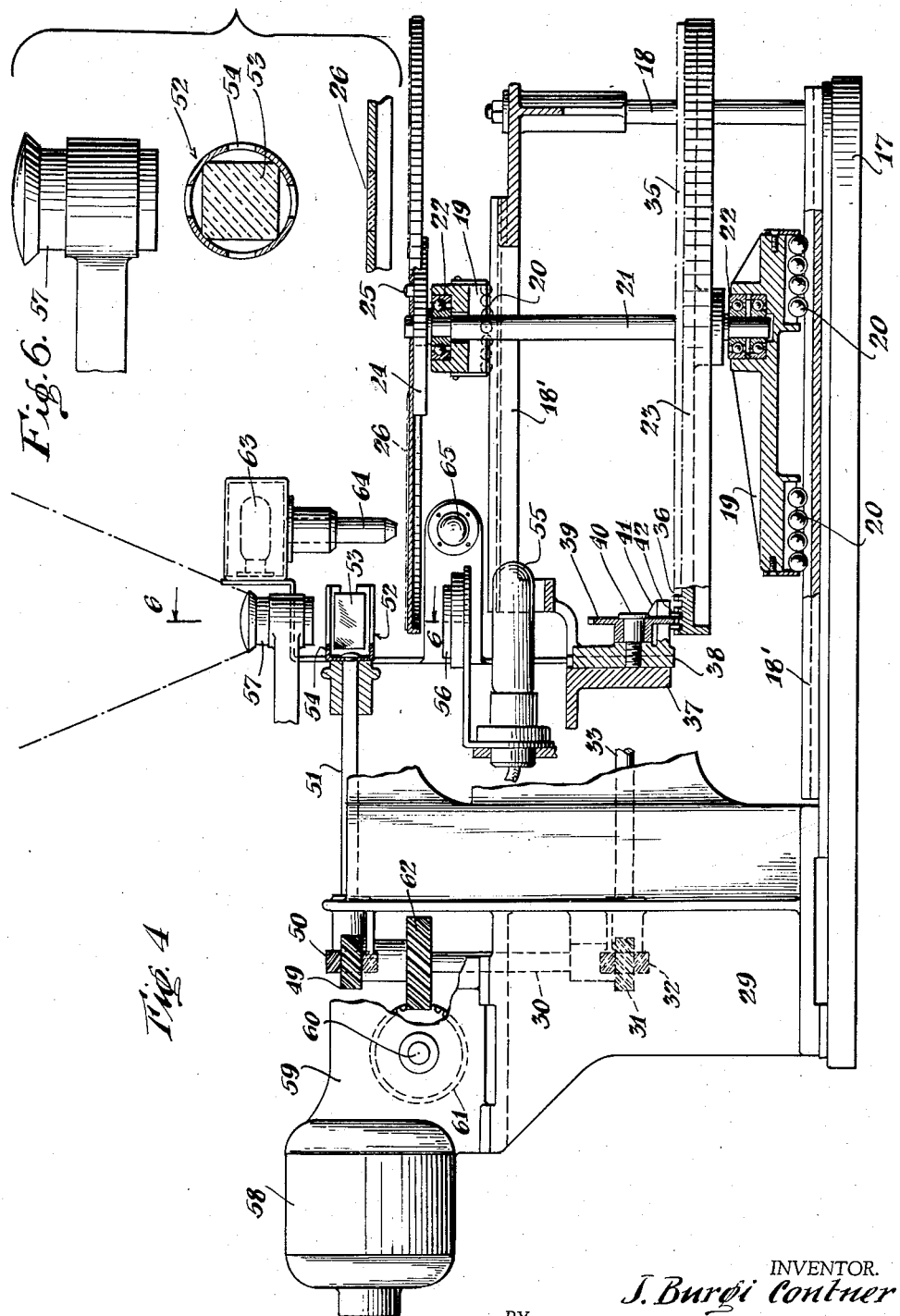

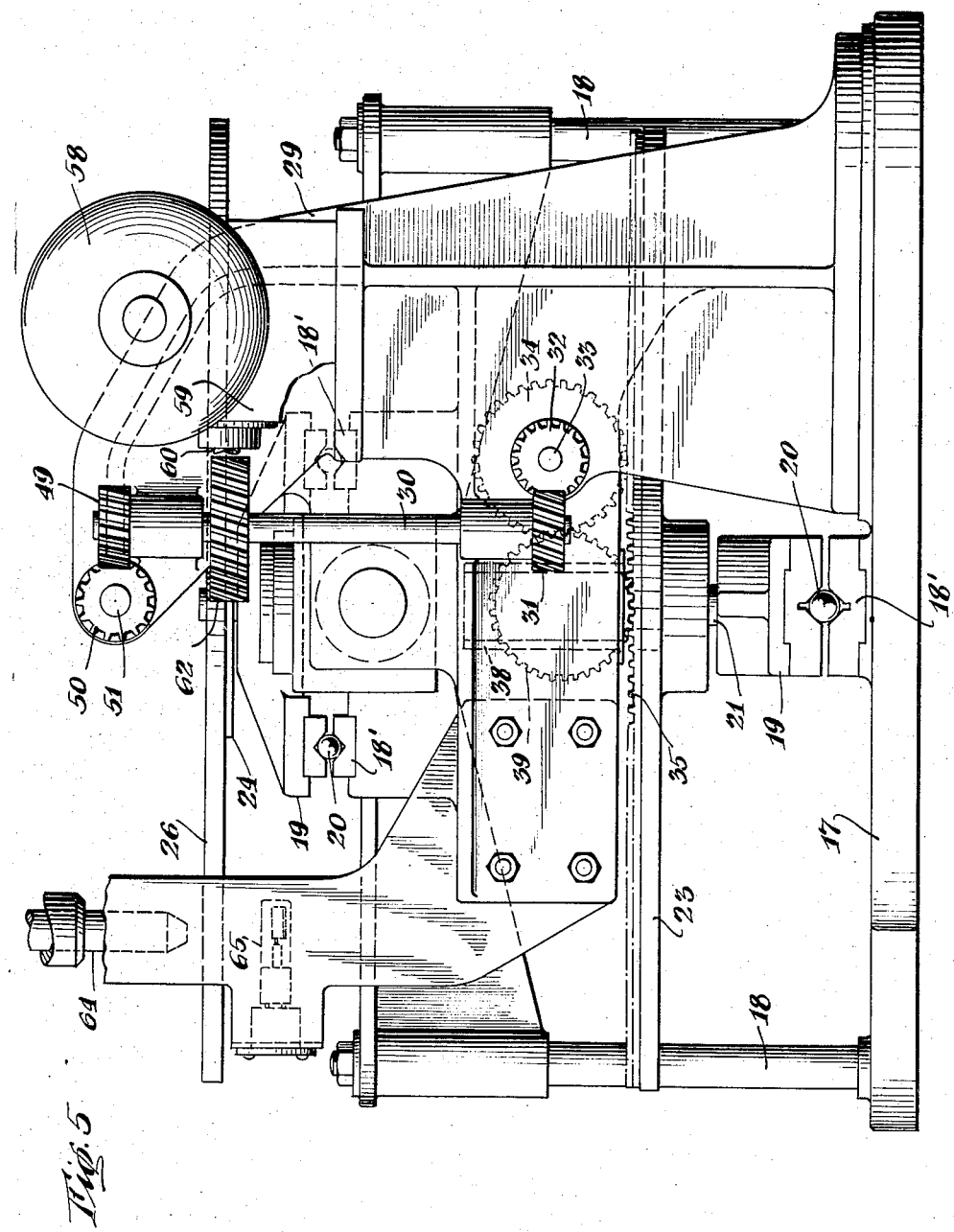

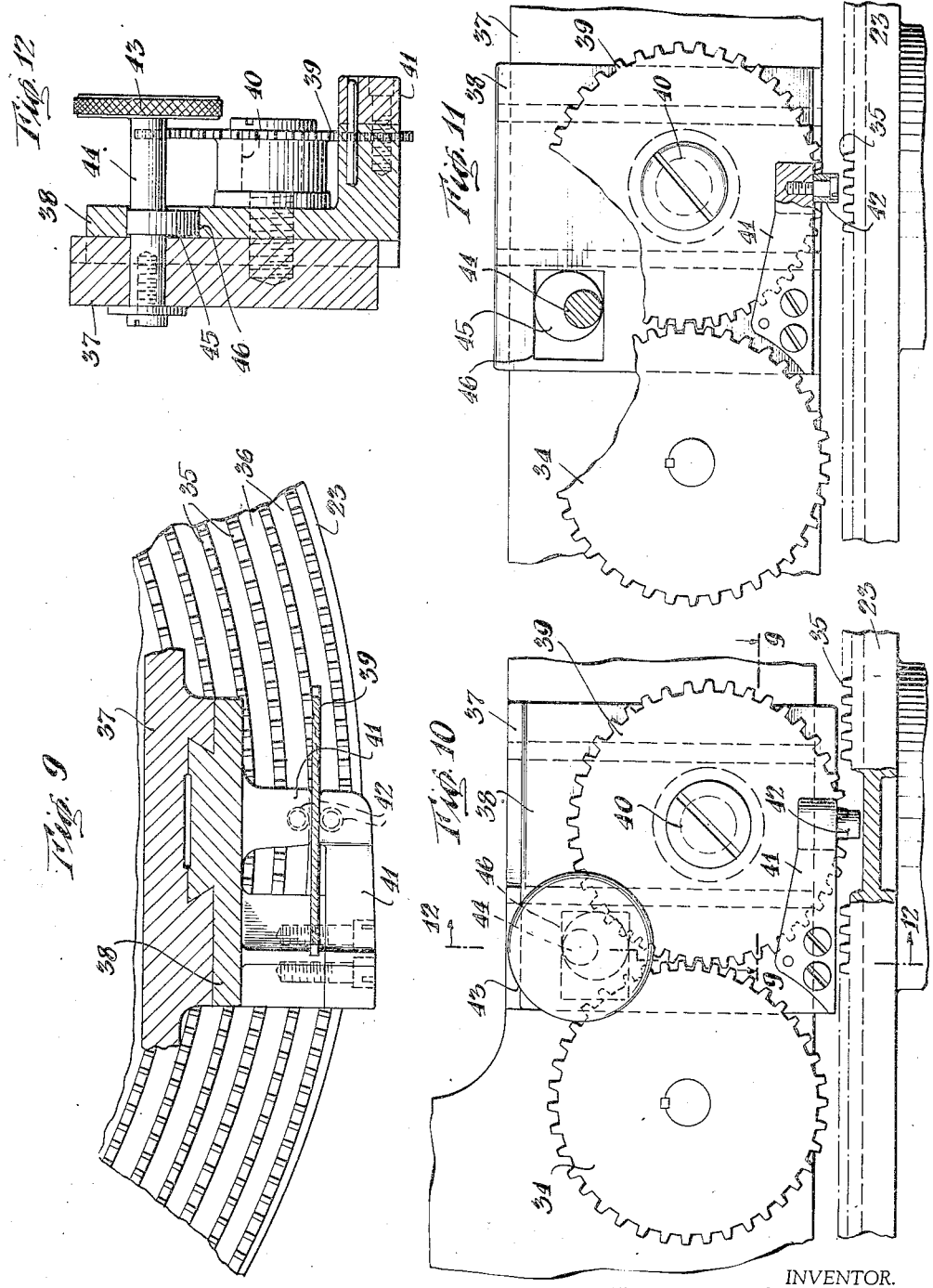

Patented Apr. 11, 1944

2,346,472

UNITED STATES PATENT OFFICE 2,346,472

DISPLAY APPARATUS

J. Burgi Contner, New York, N. Y., assignor, by mesne assignments, to Great American Industries, Inc., Meriden, Conn., a corporation of Delaware Application June 4, 1941, Serial No. 396,621

7 Claims. (Cl. 88—16.2)

This invention relates to a functionally and structurally improved display apparatus and in its more specific aspects aims to provide a compact arrangement of units by means of which, motion pictures together with sound and sound effects may be simultaneously rendered for the benefit of an observer.

An object of the invention is that of providing a non-distortable and readily stored display plate or record which may be handled without fear of breakage and which will incorporate both a sound reproducing structure, as well as a successive series of photographs providing a motion picture record.

An additional object is that of furnishing a display apparatus which will be substantially automatic in operation and will accordingly require no manual supervision.

Still another object is that of providing a mechanism of this type and in which with minimum effort, it will be feasible to remove one record and substitute another therefor. Moreover, the "threading" or initiation of record operation will occur—by the teachings of the present invention—in an entirely automatic manner so that it need be no conscious concern of the operator.

A further object is that of constructing an apparatus which will embody relatively few parts, each individually simple and rugged in design, such parts operating for long periods of time with freedom from all difficulties.

With these and other objects in mind, reference is had to the attached sheets of drawings illustrating one practical embodiment of the invention and in which:

Fig. 3 is a plan view of the mechanism;

Fig. 4 is a sectional side view of the apparatus as shown in Fig. 3;

Fig. 5 is an end elevation of such apparatus;

Fig. 6 is an enlarged sectional view taken along the lines 6—6 and in the direction of the arrows as indicated in Fig. 4;

Fig. 7 is a somewhat enlarged fragmentary face view of a portion of the drive mechanism;

Fig. 8 is a sectional view of the mechanism as shown in Fig. 7;

Fig. 9 is a sectional plan view taken along the lines 9—9 and in the direction of the arrows as indicated in Fig. 10;

Fig. 10 is a fragmentary side view of a detail of the drive mechanism with certain of the parts broken away to disclose underlying constructions;

Fig. 11 is a view similar to Fig. 10 but showing the parts in shifted positions; and Fig. 12 is a transverse sectional view taken along the lines 12—12 and in the direction of the arrows as indicated in Fig. 10.

Figure 2:
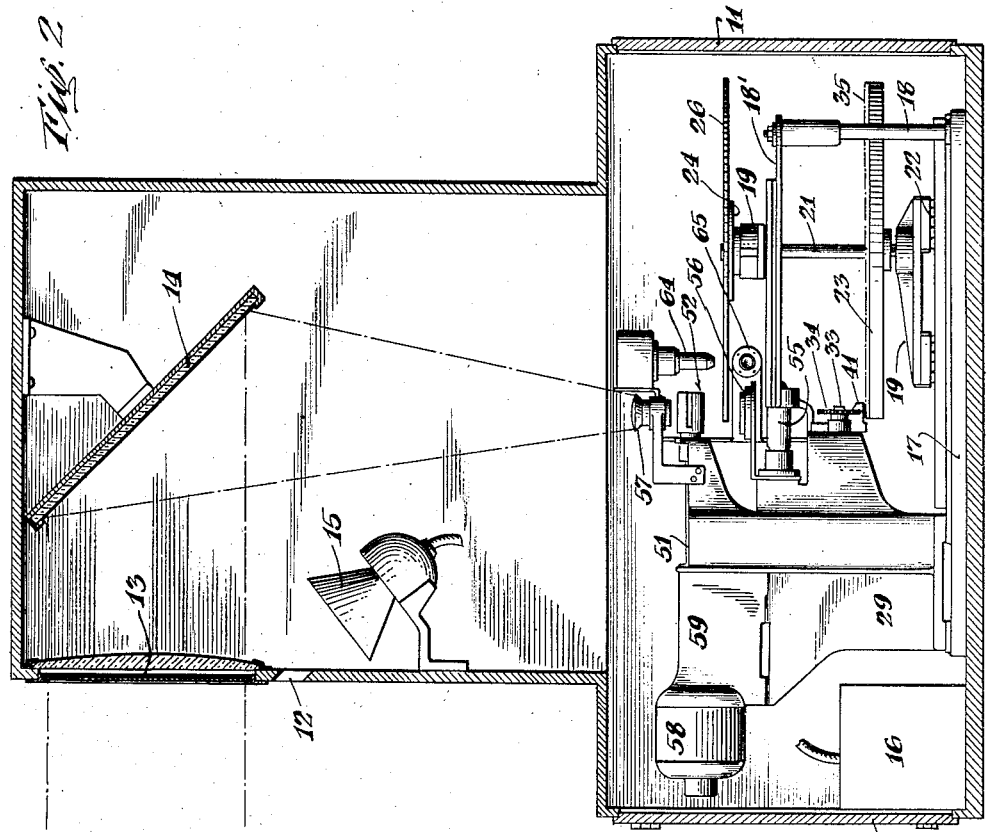
Fig. 2 is a sectional side view taken along the lines 2—2 and in the direction of the arrows as indicated in Fig. 1.
Figure 1:
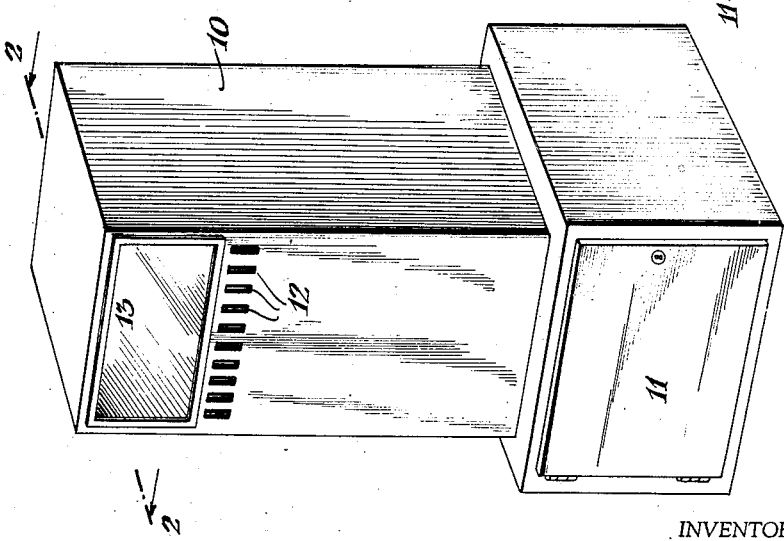
Fig. 1 is a perspective view of a cabinet which may form a part of and include the desired apparatus.

Referring primarily to Figs. 1 and 2, the numeral 10 indicates a cabinet which may be formed of any desirable material and may have any convenient and artistic configuration. Moreover, this cabinet may be provided with doors or panels 11 and through which access to the interior may be had. Conveniently, the base of the cabinet may be enlarged to provide ample space for the accommodation of the main units of the apparatus. The cabinet may be of any desirable height, compatible with a proper viewing of the display upon a screen 13 mounted to be visible through an opening in the side wall of the cabinet. This screen may be optically related to a mirror 14 disposed within the cabinet, and the screen itself, as especially shown in Fig. 2, may be shaped to provide a condenser structure, such that the images projected thereon will have desirable definition.

Adjacent the aperture framing the screen 13, the cabinet may be provided with a series of openings 12 through which sound waves may pass and adjacent these openings and within the cabinet there may be mounted a reproducing device 15 of any desirable type coupled to an electrical amplifier unit generally indicated at 16. It will be obvious to those skilled in the art, that any number of alternative arrangements of the mechanism might be resorted to, these depending largely upon the type of acoustical system which is employed, whether a wide angle lens is utilized, whether a series of reflective mirrors are employed, etc. These various obvious alternatives have not been illustrated in order to avoid unnecessary amplification of the drawings and having in mind, that merely one form and the simplest arrangement of the mechanism has been herein illustrated and described.

The structure whereby an operation of the record is secured is probably best illustrated in Figs. 3, 4 and 5 to which primary reference is made. As will be observed, this mechanism may include a base 17 disposed within the cabinet and from which supporting posts 18 extend. Having in mind that in the illustrated embodiment, the projection axis remains stationary while the record body is traversed in a sidewise direction, the base and posts mount rail portions 18' upon which carriages 19 are supported. Such support may be provided by interposed anti-friction elements 20 which will permit of the shifting of the carriages along the rails with minimum effort. These carriages mount a shaft 21 preferably by means of ball bearing assemblies 22 or similar units. Secured against movement with respect to the shaft is a driving plate 23 as well as a mounting plate or hub 24. The latter may have associated with it, a pin 25 or other suitable positioning element and which serves to secure against movement with respect to the shaft 21, a projection or record disc 26.

This disc may embrace any suitable transparent body or base formed, for example, of one of the transparent synthetic plastics, or other suitable material and upon the face of which, a sensitized coating defines a spiral series of frames 27. Each of these frames embraces positive pictures or images which may be projected and enlarged upon a screen by means of a suitable light source and lens assembly. Forming a part of the record is a sound track. While this track might be disposed in any desirable and acceptable manner with reference to the spiral series of frames, it is preferred that it intervene the convolutions of the latter as has been indicated at 28. This sound track conveniently includes merely a conventional band, such as is commonly employed in ordinary 35 mm. film and such as is suitable for cooperation with a photo-electric cell. Also, while this track may be arranged in any desired manner with respect to the frames upon the body 26, it is preferred that with the layout of apparatus, as illustrated, the related portions of the track be off-set or displaced approximately 45° from the corresponding frame. The record 26 is provided with an opening which accommodates the outer end of shaft 21 and is moreover formed with a further opening to receive the pin or abutment 25. Accordingly, the disc 26 when associated with the shaft 21 will always have a predetermined position with reference to the same.

The base 17 may also mount a supporting structure 29 carrying a rotary shaft 30. To the lower end of this shaft, a drive gear 31 may be secured and which meshes with a gear 32 affixed to a shaft 33. The latter has its outer end overlying the track 18' and mounts a gear 34. It is by means of this gear that the drive plate 23 is rotated to thereby rotate shaft 21. As will be seen, especially referring to Figs. 7 and 8, plate 23 has secured to its face or formed thereon, a gear 35 which comprises a series of teeth arranged in the form of a spiral. Between the convolutions of the spiral, grooves or track-ways 36 are provided. The distance between the adjacent convolutions of the groove 36 is equal to the distance between the centers of proximate frames 27 in adjacent convolutions on the plate 26. This is a preferred arrangement, but as will be apparent, numerous alternative structures might be employed although these should always include a groove or trackway, such that relative movements in a sidewise direction of the projection axis with respect to the record may be secured. Also, any alternative structures should provide for a positive drive or coupling between the source of power and the record unit.

The supporting structure 29 includes a bracket portion 37 within which a block 38 is slidably mounted. This has been especially shown in Figs. 9 to 12. This block rotatably mounts a gear 39 upon a shaft 40. The teeth of gear 39 mesh with the teeth of gear 34. Arms 41 are secured to block 38 and extend to each side of gear 39. These arms mount rollers 42 which extend below the periphery of gears 39. The width of the rollers is such that they may be accommodated within the grooves or tracks 36 and bear against the opposite faces of the rail portion as defined by the spiral series of gear teeth 35. The block 38 may be vertically shifted with respect to the supporting portion 37 by one of a number of different mechanisms.

However, it is preferred that the form of mechanism especially shown in Figs. 9 to 12 be generally adhered to. As will be observed, this mechanism includes a knob 43 secured to a shaft 44 mounted by the support 37. A cam 45 is situated within an opening 46 forming a part of the block 38. The area and disposition of this opening is such that, an operator by turning the knob may shift the rollers 42 and the gear 39 towards and away from the surface of the plate 23. Such shifting will not result in gear 39 becoming disengaged from gear 34. Also, it will be observed that in such shifting, the cam may—as viewed in Fig. 11—be brought to a position where it has moved past "dead center." In other words, no amount of strain will cause or permit of an accidental projection of the block 38. However, such movement of the block may readily be secured by means of an operator deliberately turning the shaft 44 to effect this result.

Obviously, with the parts in the position shown in Fig. 10, the teeth of gear 39 are in mesh with the teeth 35. Likewise the rollers 42 extend into the grooves or track-way 36 to prevent any sidewise movement of plate 23, except as governed by the action of these rollers. When the parts have been shifted to the position shown in Fig. 11, gear 39 will clear the teeth of gear 35 and rollers 42 will move entirely out of the track-way 36 and will occupy a position, such that plate 23 may be freely shifted without these rollers engaging any part of the same.

At this time, it is additionally to be noted referring to Figs. 7 and 8 that a gear 47 may be provided to operate in unison with gear 39. The gear 47 may have its teeth engage with an arcuate rail or rib 48. This arcuate section may extend well above the gearing 35 and in advance of the initial convolution of the same. The purpose of this particular construction will hereinafter be brought out.

It will also be observed that the shaft 30 which drives the gear 34 by means of the gears 31 and 32 and the shaft 33 serves to drive a gear 49. The latter meshes with the teeth of a gear 50 secured to a shaft 51. Such shaft is rotatably mounted and has coupled to its inner end, a prism assembly 52. As especially shown in Fig. 6, this assembly may include an optical body 53 enclosed by an apertured housing 54. The details of such an assembly are well known to those skilled in the art and may take numerous different forms. The function of the assembly is that of visually interrupting the projection sequence of successive frames so that the same effect is achieved, as in the case of an intermittently moving picture feed, shutter mechanism, etc. In other words, by means of this well known type of construction, it is possible to shift or feed the image-bearing strip or body continuously, rather than by an intermittent feed, and in a manner, such that the movement of the successive images upon the screen are optically interrupted.

The prism assembly 52 overlies the disc 26 in line with the projection station of the latter. Such projection station may be defined by the axis of a light source 55, a condenser lens-assembly 56 and an objective lens-assembly 57 disposed beyond the rotating optical body 53.

A rotation of shaft 30 is effected conveniently by a motor 58 which by means of a worm drive enclosed in a housing 59 serves to rotate a shaft 60. Secured to the latter is a gear 61 which meshes with a gear 62 attached to shaft 30. Consequently, a common source of power may be provided for both the drive which shifts the plate 26 as well as the prism assembly. Additionally, it will be apparent that by this construction, a perfect synchronization of shafts 33 and 51 is assured.

As shown especially in Figs. 3, 4 and 5, a sound-exciter lamp 63 may be provided which through the instrumentality of a reduction lens and optical-slit assembly 64 directs light rays upon the transparent body 26 in line with the sound track 28 thereof. A photo-electric cell 65 is mounted in optical alignment with the assembly 64. This cell is connected to the amplifier 16.

In operating a mechanism of this type, it will primarily be understood that a record plate or disc 26 is applied to the turn-table or hub 24 with the abutment or pin 25 establishing a proper position of the parts with respect to each other. Prior to such application, the carriages 19 will have been shifted along the rails 18 so that the projection axis will be adjacent the periphery of the plate 26 or else beyond the same. The motor 58 may now be operated to effect a rotation of shaft 30 and accordingly a rotation of shaft 33 and gear 34. Prior to such operation of the motor, the block 38 will have been shifted to the position shown in Figs. 7 and 10. The arcuate track portion or segment 48 may now be brought into engagement with the teeth of gear 47. At this time it is to be noted that gear 47 is provided with one tooth for each of the frames 27 of the record disc. Moreover, the segment 48 is provided with correspondingly spaced notches to receive the teeth of gear 47. Consequently with the latter rotating incident to the drive afforded by gear 39, the plate 23 will be turned and the teeth of gear 39 will engage the first of the series of teeth 35. This structure will, in other words, function to at all times assure a "threading" or introduction of the plate 23 so that it is properly engaged by the gear 39 and rollers and so that the first frame of the series upon the record will be moved in proper relationship with respect to the projection axis and such movement will be synchronized with the movement of the prism assembly. With the parts thus connected, plate 23 will be rotated and such rotation will continue until gear 39 rides beyond the inner-most convolution of the spiral gear 35.

Simultaneously with the engagement of gear 39 with gearing 35, the rollers 42 will have been disposed upon opposite sides of the rib or trackway defined by the gearing 35. Consequently, as the gear 39 traverses the gear 35 and due to the fact that the rollers 42 are not capable of being axially displaced, plate 23 will have imparted to it, a sidewise movement. Such sidewise movement will cause the optical axis of the condenser 56, assembly 52 and objective lens 57 to traverse the frames 27.

It follows that the light rays will be projected onto the mirror 14 or any other desired surface and will be defined in the form of light images upon the rear of screen 13. Consequently, an observer may clearly see these images. Simultaneously, and throughout the entire length of the spiral sound track, the sound exciter lamp 63 will energize the photo-electric cell 65 in order to correspondingly energize the amplifier 16 and actuate the sound reproducer 15. This operation of the parts will continue until the gear 39 ceases to drive the plate 23 and shaft 21. During the foregoing operation, the carriages 19 will, of course, have been traversing the rails 18'. Consequently, the optical axis of the objective lens 57 will have intercepted the longitudinal axes of the individual frames 27 and throughout the several convolutions of the latter.

During this entire operation, it will be obvious that the frames 27 and the sound track will have had a constant linear speed imparted to them. In other words, the surface of the record in line with the projection aperture, will have been moving at a constant rate of speed and despite the fact that the peripheral speed of the record will have increased as the optical axis intercepts inner convolutions of the frames 27. While a different functioning of the parts might—with revision of the structure—be achieved, it is preferred that the general arrangement and lay-out as herein described and illustrated be adhered to.

Upon a projection operation having been completed, the motor 58 may have its operation interrupted and the gear 39 and rollers 42 may be brought to their plate-clearing position. Accordingly, plates 23 and 26 may be shifted by causing the carriages 19 to traverse the rails 18'. Thereupon, plate 26 may be removed from the turn table 24 and a new plate substituted and the entire operation repeated.

From the foregoing, it will be appreciated that among others, the several objects as specifically aforenoted are achieved. Obviously, numerous changes in construction and rearrangements of the parts might be resorted to without departing from the spirit of the invention as defined by the claims.

I claim:

1. In an apparatus of the character described, a gear, a drive plate comprising a body, a series of spirally arranged gear teeth forming a part of said body and adapted to be engaged by the teeth of the gear, an arcuate section secured to said plate and disposed in advance of the gear teeth associated with the latter and a further gear wheel connected to said first named wheel and cooperative with said arcuate section to introduce said first named gear wheel into engagement with the teeth of said spiral series in a predetermined manner; said section being formed with notches to receive the teeth of said further gear wheel, said notches and the teeth of said latter gear wheel being spaced a distance greater than the spacing of the gear teeth forming a part of said body and of said first named gear.

2. A display device comprising, in combination, means providing a fixed projection axis, means providing a sound "pick-up" at a fixed position laterally of said projection axis, a support for a transparent record disc having a spiralled series of picture frames and an intervening spiralled sound track fixed upon a substantially vertically disposed rotatable shaft, a carriage rotatably supporting said shaft and mounted for free movement upon substantially lateral guides to carry such record disc across said projection axis, a laterally extending member mounted upon said shaft and provided with a spiralled series of engaging means, driving means to cooperate with said engaging means to cause such record to be rotated continuously, and guide means to cooperate with said member to cause said carriage as said support is rotated to move laterally whereby said projection axis is caused to be traversed by the spiralled series of picture frames and the fixed position of said "pick-up" is traversed by the spiralled sound track.

3. A display device comprising, in combination, means providing a fixed projection axis, means providing a sound "pick-up" at a fixed position laterally of said projection axis, a support for a transparent record disc having a spiralled series of picture frames and an intervening spiralled sound track fixed upon a substantially vertically disposed rotatable shaft, a carriage rotatably supporting said shaft and mounted for free movement upon substantially lateral guides to carry such record disc across said projection axis, a lateral plate mounted upon said shaft, a projecting spiralled rack mounted on one face thereof, a driving pinion to engage with said rack to cause such record to be rotated continuously, and guide means engaging opposite sides of said rack to cause said carriage as said support is rotated to move laterally whereby said projection axis is caused to be traversed by the spiralled series of picture frames and the fixed position of said "pick-up" is traversed by the spiralled sound track.

4. A display device comprising, in combination, means providing a fixed projection axis, means providing a sound "pick-up" at a fixed position laterally of said projection axis, a support for a transparent record disc having a spiralled series of picture frames and an intervening spiralled sound track fixed upon a substantially vertically disposed rotatable shaft, a carriage rotatably supporting said shaft and mounted for free movement upon substantially lateral guides to carry such record disc across said projection axis, a lateral plate mounted upon said shaft, a projecting spiralled rack mounted on one face thereof, a driving pinion to engage with said rack to cause such record to be rotated continuously, substantially vertically movable means carrying said pinion to permit the later selectively to be brought into and out of engagement with said rack, and guide means engaging oposite sides of said rack to cause said carriage as said support is rotated to move laterally whereby said projection axis is caused to be traversed by the spiralled series of picture frames and the fixed position of said "pick-up" is traversed by the spiralled sound track.

5. A display device comprising, in combination, means providing a fixed projection axis, means providing a sound "pick-up" at a fixed position laterally of said projection axis, a support for a transparent record disc having a spiralled series of picture frames and an intervening spiralled sound track fixed upon a substantially vertically disposed rotatable shaft, a carriage rotatably supporting said shaft and mounted for free movement upon substantially lateral guides to carry such record disc across said projection axis, a lateral plate mounted upon said shaft spaced a distance below said record support, a spiralled series of engaging means on one face of said plate, driving means to engage with said engaging means to cause such record to be rotated continuously, a fixed light source for said projection axis mounted between said record support and said plate to be beneath such record, a rotating prism assembly mounted above said record support in said projection axis, and guide means engaging with said plate to cause said carriage as said support is rotated to move laterally whereby said projection axis is caused to be traversed by the spiralled series of picture frames and the fixed position of said "pick-up" is traversed by the spiralled sound track.

6. In an apparatus of the character described, means for supporting a record disc having a spiralled record, means to rotate said support comprising a member provided with a spiralled series of engaging means spaced a certain distance apart, driving means to cooperate with said engaging means to cause such record to be rotated, and synchronizing feeder means comprising a section of engaging means on said member spaced apart a greater distance than the spacing of said first-mentioned engaging means and means driven from said driving means to cooperate with said second-mentioned engaging means whereby the latter are readily engaged in any radial position of said member and bring the latter during rotational movement thereof to a position whereby said first-mentioned engaging means are accurately meshed with said driving means.

7. A display device comprising, in combination, means providing a fixed projection axis, means providing a sound "pick-up" at a fixed position laterally of said projection axis, a support for a transparent record disc having a spiralled series of picture frames and an intervening spiralled sound track fixed upon a substantially vertically disposed rotatable shaft, a carriage rotatably supporting said shaft and mounted for free movement upon substantially lateral guides to carry such record disc across said projection axis, a laterally extending member mounted upon said shaft and provided with a spiralled series of engaging means spaced a certain distance apart, driving means to cooperate with said engaging means to cause such record to be rotated continuously, guide means to cooperate with said member to cause said carriage as said support is rotated to move laterally whereby said projection axis is caused to be traversed by the spiralled series of picture frames and the fixed position of said "pick-up" is traversed by the spiralled sound track, and synchronizing feeder means comprising a section of engaging means on said member spaced apart a greater distance than the spacing of said first-mentioned engaging means and means driven from said driving means to cooperate with said second-mentioned engaging means whereby the latter are readily engaged in any radial position of said member and bring the latter during rotational movement thereof to a position whereby said first-mentioned engaging means are accurately meshed with said driving means.

J. BURGI CONTNER.